United States Patent [19]

Wunsche

[11] 3,851,417

[45] Dec. 3, 1974

[54] COCKROACH TRAP

[76] Inventor: Anton E. Wunsche, 656 W. 162nd St., New York, N.Y. 10032

[22] Filed: Dec. 5, 1973

[21] Appl. No.: 422,105

Related U.S. Application Data

[63] Continuation-in-part of Ser. No. 330,671, Feb. 8, 1973, and a continuation-in-part of Ser. No. 153,709, June 16, 1971, abandoned.

[52] U.S. Cl. ............................................. 43/121
[51] Int. Cl............................................. A01m 1/00
[58] Field of Search............................ 43/121; 99/3

[56] References Cited
UNITED STATES PATENTS

| 149,918 | 4/1874 | Clough.................. | 43/121 |
| 602,410 | 4/1898 | Selvidge................ | 43/121 |
| 1,018,277 | 2/1912 | Suhre..................... | 43/121 |
| 1,569,170 | 1/1926 | Braun et al............ | 43/121 |
| 1,700,517 | 1/1929 | Ross...................... | 43/121 X |
| 1,867,252 | 7/1932 | Crigler.................. | 43/121 |
| 2,167,978 | 8/1939 | Jennerich............... | 43/121 |
| 2,606,391 | 8/1952 | McGrew................. | 43/121 |
| 2,741,066 | 4/1956 | Conway.................. | 43/121 |
| 2,997,806 | 8/1961 | Duvall.................... | 43/121 |

FOREIGN PATENTS OR APPLICATIONS

| 293,187 | 2/1932 | Italy....................... | 43/121 |
| 10,270 | 5/1908 | Great Britain.......... | 43/121 |
| 517,494 | 6/1920 | France................... | 43/121 |

Primary Examiner—Louis G. Mancene
Assistant Examiner—J. Q. Lever
Attorney, Agent, or Firm—Karl F. Ross; Herbert Dubno

[57] ABSTRACT

A trap for crawling insects, such as cockroaches, comprises a cylindrical container with a detachable lid having a central opening large enough to admit an insect, this opening being aligned with a supply of bait on the container bottom. A downward extension of the lid adjacent its opening, such as a collar surrounding that opening, terminates high enough above the bottom to allow the insect to drop down onto the bait but not to return to the opening by the same path. The inner peripheral wall of the container is coated with a slippery film, such as a mixture of lanolin and linseed oil, preventing the insect from climbing that wall. The bait may be contained in a cup-shaped receptacle removably seated on a central boss of the container bottom.

10 Claims, 4 Drawing Figures

COCKROACH TRAP

REFERENCE TO RELATED APPLICATION

This application is a continuation-in-part of my prior application Ser. No. 330,671 filed Feb. 8, 1973 as a continuation-in-part of my abandoned application Ser. No. 153,709 filed June 16, 1971.

FIELD OF THE INVENTION

My present invention relates to a trap for crawling insects, particularly for cockroaches.

BACKGROUND OF THE INVENTION

Cockroaches, which tend to infest dwellings as well as commercial establishments such as restaurants, are considered highly resourceful in avoiding all kinds of traps set for them. They are, on the other hand, known to take chances in order to get at supplies of food, despite their limited ability to move through the air by jumping or flying. Because of these highly developed instincts, attempts to lure them to their death with poisoned foodstuff have largely proved futile.

OBJECTS OF THE INVENTION

The general object of my present invention is to provide a trap for cockroaches and similar vermin which is of simple construction and reliable in operation.

A more particular object is to provide a cockroach trap which does not contain any substances that could be harmful to humans (including children) coming into contact therewith.

A related object is to provide means in such a trap for facilitating the removal of its contents and its subsequent reuse.

SUMMARY OF THE INVENTION

I have found, in accordance with the present invention, that an efficient trap for crawling insects — especially cockroaches — can be constructed from an upright, preferably cylindrical container with a closed bottom, adapted to hold a supply of bait, and with a top, advantageously in the form of a removable lid, having an aperture spaced from its rim to give access to its interior. This top is provided with a downward extension which adjoins that aperture and forms a guidepath leading toward the supply of bait but terminating sufficiently short of the container bottom to prevent an insect attracted by the bait from regaining that extension after landing on the bottom. The inner peripheral wall of the container, which would normally constitute a return path for the insect to the apertured top, is provided with a slippery coating to frustrate the insect's attempts to climb that wall.

Cockroaches come in various sizes ranging in body length from about 15 mm for the so-called "German cockroach" to approximately 50 mm for the species known as "American cockroach." The height of the container should be sufficient to make the distance from the lower edge of the guidepath to the highest point of the container bottom substantially greater than the length of the insect's body as measured from its stretched hind legs to the tips of its antennae, preferably on the order of twice that length.

This highest point of the container bottom may be the peak of a pile of bait or the rim of a receptacle holding the bait. In an advantageous embodiment such a receptacle is removably seated on the container bottom so as to permit easy refilling with fresh bait.

According to a more particular feature of my invention, the aforementioned downward extension of the container top has the shape of a collar surrounding the entrance aperture, the inner diameter of the collar being equal to or possibly somewhat larger than the aperture diameter. The height of this collar should be sufficient to let the cockroach get a foothold therein allowing it to explore the interior of the container with its antennae so that the bait will exert a strong attraction on the insect; this will cause the cockroach to let go and to drop onto the bait directly below the entrance aperture, particularly if there are other cockroaches crowding through that aperture and pushing the one in front.

In order to reduce the consumption of bait, and to simplify the emptying of the container, I prefer to limit the width of the bait receptacle to a fraction of the inner container diameter and to fill the intervening space with a shallow pool of water, e.g. less than 1 mm in height.

The slippery film coating the inner container wall is advantageously a mixture of animalic fat and a non-drying oil; mixtures of lanolin and linseed oil in approximately equal parts by weight have been found highly satisfactory. Upon removal of the lid to dump the entrapped insects and to permit extraction of the bait holder for refilling, the coating may be reapplied to the extent necessary.

The container or at least its top may be made of transparent material (glass or plastic) to permit visual inspection of its interior.

BRIEF DESCRIPTION OF THE DRAWING

The above and other features of my invention will now be described in detail with reference to the accompanying drawing in which.

Figure 1:
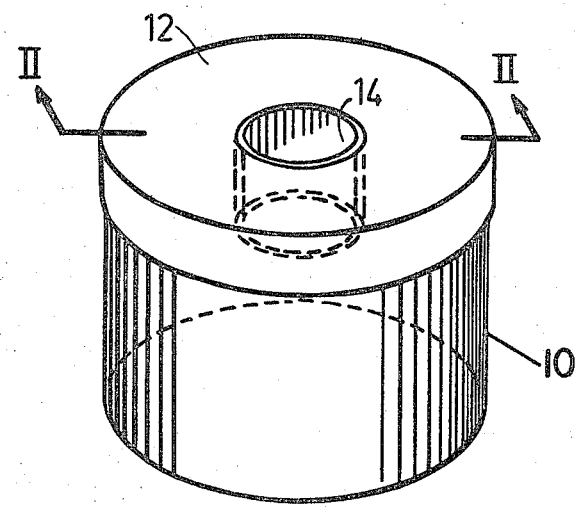
FIG. 1 is a perspective view of a cockroach trap according to my invention.
Figure 2:
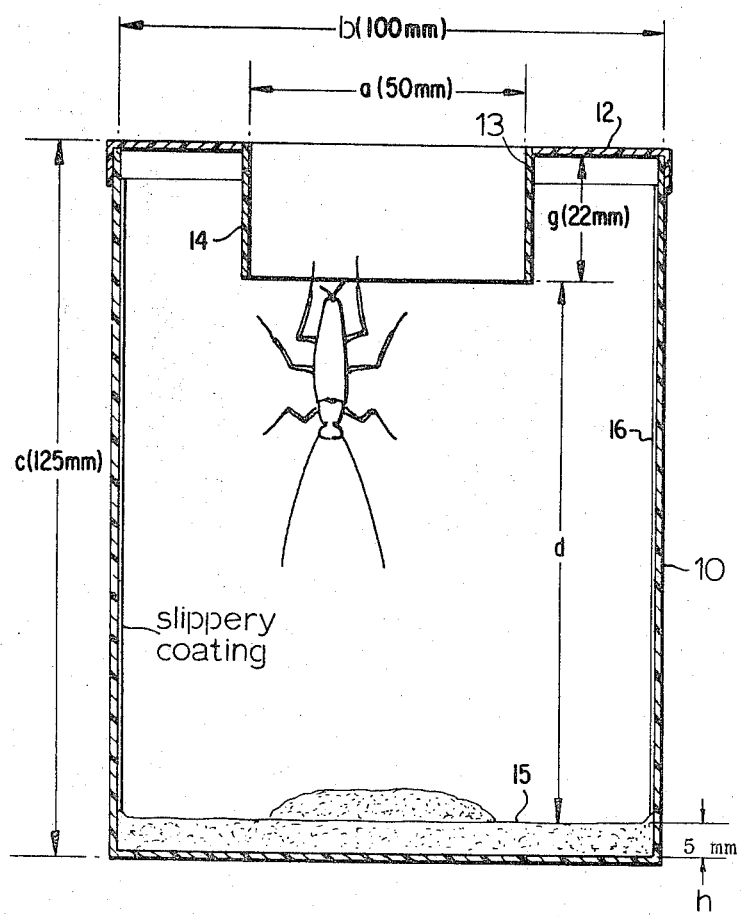
FIG. 2 is a sectional elevation of the trap of FIG. 1, taken on the line II—II thereof but drawn to a larger scale.

The cockroach trap shown in FIGS. 1 and 2 comprises a cylindrical, upwardly open container 10 of transparent plastic sheet material, such as polyacrylate, provided with a detachable lid 12 of similar material having a central aperture 13 framed by an integral collar 14 which forms a downward extension of the lid. The bottom of container 10 is covered with a layer 15 of bait piled somewhat higher at the center, below collar 14. The inner peripheral wall of the container is lined with a coating 16 of slippery material, such as the aforementioned mixture of lanolin and linseed oil.

The diameter $a$ of entrance aperture 13 is a fraction of the diameter $b$ of lid 12 which forms a flat annular platform around that aperture to make it easier for cockroaches to approach the bait. As illustrated in FIG. 2, a cockroach attracted by the bait will explore the interior of the container while hanging down by its hind legs from the lower rim of collar 14. In most instances, either by its own volition or under pressure from other cockroaches, it will then drop down onto the pile of bait 15 from which it will no longer be able to reach the collar 14. Any attempts to climb the container wall will be frustrated by the slippery coating 16 thereof.

Naturally, the entrance aperture 13 should be wide enough to admit cockroaches of the species to be trapped, including pregnant females. In the specific example given in FIG. 2, which I have found satisfactory in practice, the diameter $a$ of that aperture is 50 mm compared with a diameter $b$ of 100 mm for the interior of the container 10 and its lid 12. The height $c$ is 125 mm; with the height $h$ of the bait layer 15 equal to 5 mm, and with the height $g$ of collar 14 equaling 22 mm, the distance $d$ between the collar and the bait is close to 100 mm or about 1¾ times the overall length of the outstretched insect as shown in FIG. 2. Naturally, these dimensions can be varied and, especially for the larger "American" cockroach, could be considerably increased.

Figure 4:
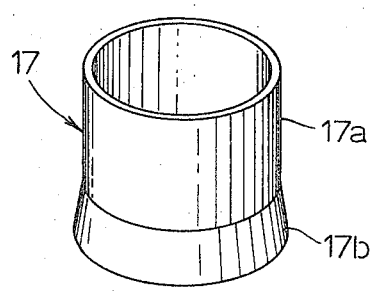
FIG. 4 is a perspective view of a bait receptacle forming part of the trap of FIG. 3.
Figure 3:
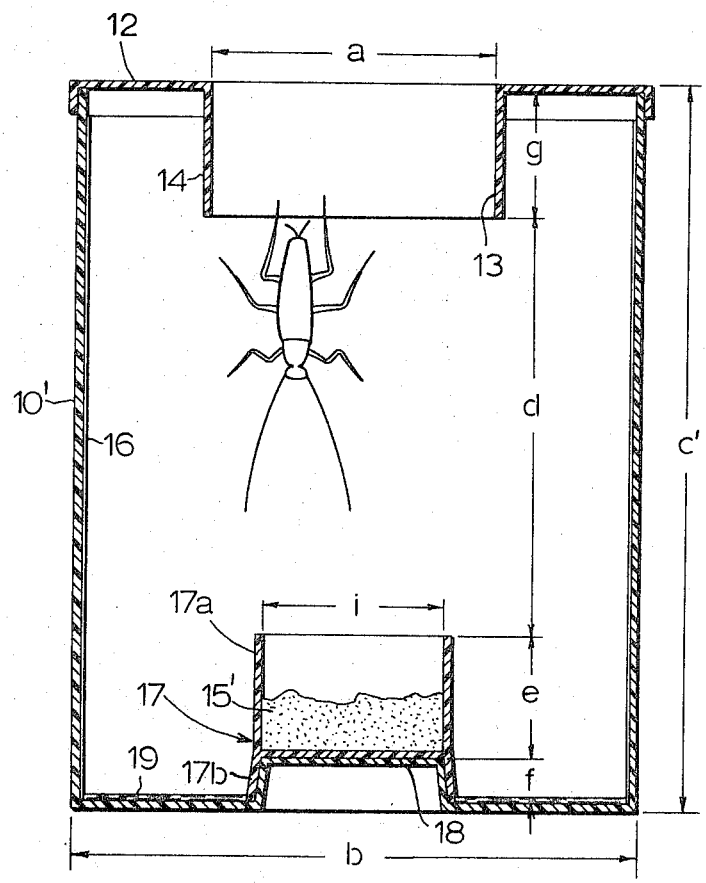
FIG. 3 is a view similar to FIG. 2, illustrating a modification.

In FIG. 3 I have illustrated a modified container 10' whose bottom is formed with a central boss 18 of slightly frustoconical configuration serving as a base for a removable receptacle 17 designed as a bait holder (see also FIG. 4). This receptacle has a cylindrical upper portion 17a, of a diameter $i$ somewhat less than the diameter $a$ of aperture 13 and collar 14, and a frustoconical lower portion 17b forming a socket which frictionally engages the boss 18 to hold the receptacle in its position coaxial with container 10' and collar 14. The charge of bait 15' in receptacle 17 is exposed at the top to attract the cockroaches; when it has been depleted, lid 12 may be lifted off and (after the dumping of the entrapped insects) the receptacle 17 may be withdrawn for reloading. A shallow pool of water 19 surrounds the boss 18.

In a cockroach trap successfully tested in practice, with dimensions $a$ and $b$ similar to those of FIG. 2, the receptacle diameter $i$ was 33 mm, the height $e$ of baitholder portion 17a was 20 mm and the height $f$ of the socket portion 17b was 8 mm; the vertex angle of the frustocone of the socket and of the boss 18 was about 15°. With distance $d$ again close to 100 mm, and with the axial length $g$ of collar 14 increased to 30 mm, the overall height $c'$ of the container was somewhat greater than the corresponding dimension $c$ in FIG. 2. In general, the height $g$ of the collar should approximate the body length of the insect (without cerci, legs and antennae), a suitable minimum height being thus about 15 mm. Heights greater than 35 mm can be employed but this only increases the overall dimensions without materially improving the effectiveness of the trap, especially in the case of the shorter "German" cockroach.

The bait may be an ingestible mixture of conventional composition.

The presence of pool 19 in the trap of FIG. 3, in lieu of a bait layer 15 as in the first embodiment, makes it easier to clean out the container 10' since the bodies of the trapped cockroaches will not cling to its bottom.

I claim:

1. A trap for crawling insects, comprising an upright container with a closed bottom adapted to hold a supply of bait and with a top having an aperture spaced from the rim thereof, said top being provided with a downward extension adjoining said aperture and forming a guidepath leading toward said supply of bait but terminating sufficiently short of said bottom to prevent an insect attracted by the bait from regaining said extension after landing on said bottom, and a slippery coating on the inner peripheral wall of said container for frustrating attempts of the insect to climb said wall, said coating comprising a mixture of lanolin and linseed oil.

2. A trap as defined in claim 1 wherein said bottom is provided with a cup-shaped receptacle for said bait spaced from said peripheral wall.

3. A trap as defined in claim 2 wherein said bottom and said receptacle are provided with mating formations enabling withdrawal of said receptacle for refilling, said top being a removable lid giving access to said receptacle.

4. A trap as defined in claim 3 wherein said formations include a furstoconical boss on said bottom and a complementary socket on said receptacle.

5. A trap as defined in claim 2 wherein said extension comprises a collar depending from said top above said receptacle.

6. A trap as defined in claim 5 wherein said peripheral wall, said collar and said receptacle are substantially cylindrical and centered on a common axis.

7. A trap as defined in claim 6 wherein said collar and said aperture have a diameter exceeding that of said receptacle.

8. A trap as defined in claim 1 wherein at least said top is transparent.

9. A trap as defined in claim 1 wherein said coating consists essentially of lanolin and linseed oil in substantially equal parts.

10. A trap as defined in claim 1 wherein said top is flat around said aperture.

* * * * *